US006751233B1

(12) United States Patent
Hann (10) Patent No.: US 6,751,233 B1
(45) Date of Patent: Jun. 15, 2004

(54) UTOPIA 2—UTOPIA 3 TRANSLATOR (75) Inventor: William P. Hann, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/228,687

(22) Filed: Jan. 12, 1999

Related U.S. Application Data (63) Continuation-in-part of application No. 09/227,451, filed on Jan. 8, 1999, now Pat. No. 6,449,655.

(51) Int. Cl.[7] .................................................. H04J 3/16
(52) U.S. Cl. ..................... 370/466; 370/395.6; 370/401; 370/467
(58) Field of Search ............................. 370/391, 395.1, 370/397, 395.3, 395.6, 395.7, 395.72, 401, 404, 412, 415, 417, 419, 465, 466, 395.4, 395.41, 395.5, 413, 437, 449, 469

(56) References Cited

U.S. PATENT DOCUMENTS

| 4,771,425 A | 9/1988 | Baran et al. .................... 370/85 |
| 4,819,228 A | 4/1989 | Baran et al. .................... 370/85 |
| 4,903,261 A | 2/1990 | Baran et al. ................ 370/94.2 |

(List continued on next page.)

FOREIGN PATENT DOCUMENTS

| EP | 0677941 A2 | 10/1995 |
| WO | WO 95/20282 | 7/1995 |
| WO | WO 96/04729 | 2/1996 |

OTHER PUBLICATIONS

"Utopia Specification Level 1, Version 2.01," (af–phy–0017.000), *The ATM Forum Committe*, Mar. 21, 1994, 19 pages.
Anthony Alles, "ATM Internetworking," *Cisco Systems, Inc.*, May 1995, 59 pages.
"Utopia Level 2, Version 1.0" (af–Phy–0039.000), *The ATM Forum Committee*, Jun. 1995, 60 pages.

*Primary Examiner*—Phirin Sam
(74) *Attorney, Agent, or Firm*—Baker Botts L.L.P.

(57) ABSTRACT

A system for an interface between a physical layer and a communication network. The system comprises a UTOPIA 3 physical layer receiver (23) operable to receive information from a physical layer device (10), a UTOPIA 2 to UTOPIA 3 controller (24) operable to receive data from UTOPIA 3 physical layer receiver (23) and convert it to a UTOPIA 2 format; and a UTOPIA 2 master receiver(25) coupled to UTOPIA 2 to UTOPIA 3 controller (24) and operable to receive information from the UTOPIA 2 to UTOPIA 3 controller (24) and send it to the higher communication network. The system also includes a UTOPIA 2 master transmitter (50) operable to receive data information from a communication network; a UTOPIA 2 to UTOPIA 3 controller transmitter (52) coupled to the UTOPIA 2 master transmitter (50) and operable to receive data from UTOPIA 2 master transmitter (50), and a UTOPIA 3 physical layer transmitter (54) operable to receive data from the UTOPIA 3 to UTOPIA 2 controller transmitter (52) and send the data to a physical layer device (10).

51 Claims, 5 Drawing Sheets

U.S. PATENT DOCUMENTS

| | | | |
|---|---|---|---|
| 4,975,906 A | 12/1990 | Takiyasu et al. | 370/85.13 |
| 4,985,889 A | 1/1991 | Frankish et al. | 370/94.1 |
| 5,020,058 A | 5/1991 | Holden et al. | 370/109 |
| 5,059,925 A | 10/1991 | Weisbloom | 331/1 A |
| 5,072,449 A | 12/1991 | Enns et al. | 371/37.1 |
| 5,088,032 A | 2/1992 | Bosack | 395/200 |
| 5,115,431 A | 5/1992 | Williams et al. | 370/94.1 |
| 5,119,403 A | 6/1992 | Krishnan | 375/39 |
| 5,128,945 A | 7/1992 | Enns et al. | 371/37.1 |
| 5,224,099 A | 6/1993 | Corbalis et al. | 370/94.2 |
| 5,255,291 A | 10/1993 | Holden et al. | 375/111 |
| 5,274,631 A | 12/1993 | Bhardwaj | 370/60 |
| 5,274,635 A | 12/1993 | Rahman et al. | 370/60.1 |
| 5,274,643 A | 12/1993 | Fisk | 370/94.1 |
| 5,313,454 A | 5/1994 | Bustini et al. | 370/13 |
| 5,317,562 A | 5/1994 | Nardin et al. | 370/16 |
| 5,359,592 A | 10/1994 | Corbalis et al. | 370/17 |
| 5,394,394 A | 2/1995 | Crowther et al. | 370/60 |
| 5,422,880 A | 6/1995 | Heitkamp et al. | 370/60 |
| 5,430,715 A | 7/1995 | Corbalis et al. | 370/54 |
| 5,434,863 A | 7/1995 | Onishi et al. | 370/85.13 |
| 5,452,306 A | 9/1995 | Turudic et al. | 370/110.1 |
| 5,461,624 A | 10/1995 | Mazzola | 370/85.13 |
| 5,473,599 A | 12/1995 | Li et al. | 370/16 |
| 5,473,607 A | 12/1995 | Hausman et al. | 370/85.13 |
| 5,509,006 A | 4/1996 | Wilford et al. | 370/60 |
| 5,517,488 A | 5/1996 | Miyazaki et al. | 370/16 |
| 5,519,704 A | 5/1996 | Farinacci et al. | 370/85.13 |
| 5,555,244 A | 9/1996 | Gupta et al. | 370/60.1 |
| 5,561,663 A | 10/1996 | Klausmeier | 370/17 |
| 5,561,669 A | 10/1996 | Lenney et al. | 370/60.1 |
| 5,570,360 A | 10/1996 | Klausmeier et al. | 370/60 |
| 5,583,862 A | 12/1996 | Callon | 370/397 |
| 5,598,581 A | 1/1997 | Daines et al. | 395/872 |
| 5,604,741 A | 2/1997 | Samueli et al. | 370/402 |
| 5,612,957 A | 3/1997 | Gregerson et al. | 370/401 |
| 5,617,417 A | 4/1997 | Sathe et al. | 370/394 |
| 5,617,421 A | 4/1997 | Chin et al. | 370/402 |
| 5,666,353 A | 9/1997 | Klausmeier et al. | 370/230 |
| 5,673,265 A | 9/1997 | Gupta et al. | 370/432 |
| 5,691,997 A | 11/1997 | Lackey, Jr. | 371/53 |
| 5,729,546 A | 3/1998 | Gupta et al. | 370/434 |
| 5,732,079 A | 3/1998 | Castrigno | 370/362 |
| 5,737,526 A | 4/1998 | Periasamy et al. | 395/200.06 |
| 5,737,635 A | 4/1998 | Daines et al. | 395/872 |
| 5,740,171 A | 4/1998 | Mazzola et al. | 370/392 |
| 5,740,176 A | 4/1998 | Gupta et al. | 370/440 |
| 5,742,604 A | 4/1998 | Edsall et al. | 370/401 |
| 5,742,649 A | 4/1998 | Muntz et al. | 375/371 |
| 5,764,636 A | 6/1998 | Edsall | 370/401 |
| 5,764,641 A | 6/1998 | Lin | 370/412 |
| 5,765,032 A | 6/1998 | Valizadeh | 395/200.65 |
| 5,787,070 A | 7/1998 | Gupta et al. | 370/217 |
| 5,787,255 A | 7/1998 | Parlan et al. | 395/200.63 |
| 5,793,763 A | 8/1998 | Mayes et al. | 370/389 |
| 5,793,978 A | 8/1998 | Fowler | 395/200.56 |
| 5,796,732 A | 8/1998 | Mazzola et al. | 370/362 |
| 5,802,042 A | 9/1998 | Natarajan et al. | 370/255 |
| 5,805,595 A | 9/1998 | Sharper et al. | 370/442 |
| 5,812,618 A | 9/1998 | Muntz et al. | 375/372 |
| 5,822,383 A | 10/1998 | Muntz et al. | 375/362 |
| 5,835,036 A | 11/1998 | Takefman | 341/95 |
| 5,835,481 A | 11/1998 | Akyol et al. | 370/216 |
| 5,835,494 A | 11/1998 | Hughes et al. | 370/397 |
| 5,835,725 A | 11/1998 | Chiang et al. | 395/200.58 |
| 5,838,915 A | 11/1998 | Klausmeier et al. | 395/200.45 |
| 5,838,994 A | 11/1998 | Valizadeh | 395/876 |
| 5,859,550 A | 1/1999 | Brandt | 327/156 |
| 5,864,542 A | 1/1999 | Gupta et al. | 370/257 |
| 5,867,666 A | 2/1999 | Harvey | 395/200.68 |
| 6,147,997 A * | 11/2000 | Holden et al. | 370/395.1 |
| 6,266,324 B1 * | 7/2001 | Kirino et al. | 370/230 |
| 6,307,858 B1 * | 10/2001 | Mizukoshi et al. | 370/395.7 |
| 6,449,655 B1 * | 9/2002 | Hann et al. | 370/391 |
| 6,452,927 B1 * | 9/2002 | Rich | 370/395.1 |
| 6,535,522 B1 * | 3/2003 | Arato et al. | 370/466 |

\* cited by examiner

UTOPIA 2— UTOPIA 3 TRANSLATOR

RELATED APPLICATIONS

This application is a continuation-in-part of application Ser. No. 09/227,451 and claims priority to U.S. Patent No. 6,449,655 filed Jan. 8, 1999, by Hann et al., entitled *"Method and Apparatus for Communication Between Network Devices Operating at Different Frequencies"*.

TECHNICAL FIELD OF THE INVENTION

This invention relates generally to telecommunication networks and more specifically to a UTOPIA 2-UTOPIA 3 translator.

BACKGROUND OF THE INVENTION

UTOPIA (Universal Test and Operation Interface) defines the interface between the physical layers (PHY) and higher telecommunication levels such as the asynchronous transfer mode (ATM) layer. UTOPIA defines a common PHY interface in ATM subsystems across a wide range of speeds and media types.

One common type of UTOPIA interface is the UTOPIA Level 2 or UTOPIA 2 interface. It provides a 16 bit data path and a data rate of up to 800 Mbps.

Figure 1:
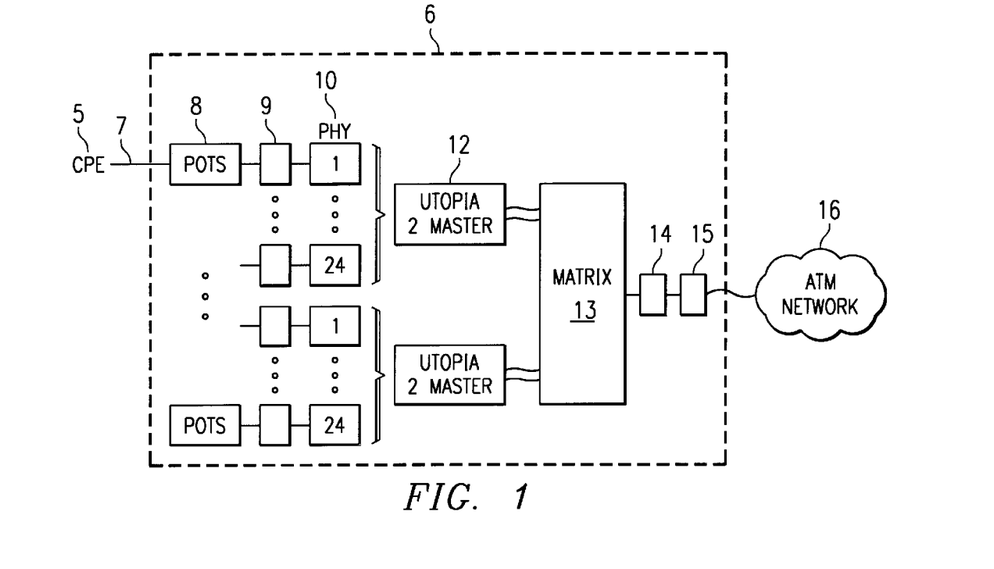
FIG. 1 illustrates the UTOPIA 2 interface in a typical embodiment.

FIG. 1 illustrates the UTOPIA 2 interface in a typical embodiment. Illustrated is a plurality of customer premise equipment (CPE) 5 (such as ADSL modems) coupled to a DSLAM 6 in a central office via transmission line 7. Transmission line 7 passes a signal to POTS splitter 8 which removes and reroutes the POTS signal from transmission line 7. The remaining data signal passes to a plurality of modems 9 which are coupled to physical layer devices (PHY) 10. Between PHY 10 and a switching matrix 13 is a UTOPIA 2 master 12 which provides the interface between physical layer devices 10 and matrix 13. Matrix 13 connects to an ATM network 16 through a UTOPIA 2 master 14 which is coupled to an OC3 physical layer device 15.

One drawback of UTOPIA 2 is that it is limited to 5 bit addressing. This limits a UTOPIA 2 master to address only 31 physical layer devices (the 32nd address is an idle state used by the master 22 to check each physical layer device). This further limits the number of modems in DSLAM 14.

A new version of UTOPIA, UTOPIA Level 3 or UTOPIA 3 has been proposed which overcomes the 31 physical layer limitation of UTOPIA 2. The proposed UTOPIA 3 format, as currently implemented, has a 32 bit data path versus a 16 bit data path for UTOPIA 2. UTOPIA 3 has a variable number of physical devices that can be attached as opposed to being limited to 31 devices, as in the case of Utopia 2. Also, UTOPIA 3 operates at a 100 MHZ clock speed as opposed to the 50 MHz clock speed of the UTOPIA 2 format.

Since many UTOPIA 2 masters are already installed, it would be advantageous to add UTOPIA 3 capabilities to existing UTOPIA 2 systems. For example, a current UTOPIA 2 implementation is limited to 31 physical devices due to its five bit addressing. If a system required 248 physical devices to be attached to a UTOPIA interface, it would require at least eight separate UTOPIA 2 systems to handle the 248 devices. The present inventions object is to allow a UTOPIA 3 interface to be coupled to the physical device side and a UTOPIA 2 interface on the communication switching side. In the above example, to require 248 devices from 31 UTOPIA 2 addresses would require eight UTOPIA 3 channels for every UTOPIA 2 channel, a factor of eight per channel. This would require integer of $(\log_2(248))$ lines (where 248 is equal to the total number of physical devices, or the number of UTOPIA 2 devices, 31, multiplied by the UTOPIA 3 factor), or 8 bit UTOPIA 3 addressing.

SUMMARY OF THE INVENTION

Accordingly, a need has arisen for a UTOPIA 2-UTOPIA 3 translator. The present invention includes a system and method that provides a UTOPIA 2-UTOPIA 3 translator that addresses the shortcoming of prior systems and methods.

According to one embodiment of the invention, a system with an interface between a physical layer and a communication format layer is provided. The system comprises a UTOPIA 3 receiver operable to receive information from a physical layer device, a UTOPIA 2 to UTOPIA 3 controller operable to receive data from UTOPIA 3 physical layer receiver and convert it to a UTOPIA 2 format, and a UTOPIA 2 master receiver coupled to UTOPIA 2 to UTOPIA 3 controller and operable to receive information from the UTOPIA 2 to UTOPIA 3 controller and send it to the higher communication network. The system also includes a UTOPIA 2 master transmitter operable to receive data information from a communication network, a UTOPIA 2 to UTOPIA 3 controller transmitter coupled to the UTOPIA 2 master transmitter and operable to receive data from UTOPIA 2 master transmitter, and a UTOPIA 3 physical layer transmitter operable to receive data from the UTOPIA 3 to UTOPIA 2 transmitter and send the data to a physical layer device.

The present invention provides various technical advantages. For example, a system is provided that allows for more physical devices to systems where UTOPIA 2 is already deployed without having to replace a complete system. Other technical advantages may be readily apparent to one skilled in the art from the following figures, descriptions and claims.

BRIEF DESCRIPTION OF THE DRAWINGS

For a more complete understanding of the present invention and advantages thereof, reference is now made to the following descriptions taken in conjunction with the following drawings, in which like numbers represent like parts, in which.

DETAILED DESCRIPTION OF THE INVENTION

Embodiments of the present invention and its advantages are best understood by referring to FIGS. 1 through 6 of the drawings, like numerals being used for like and corresponding parts of the various drawings.

Figure 2:
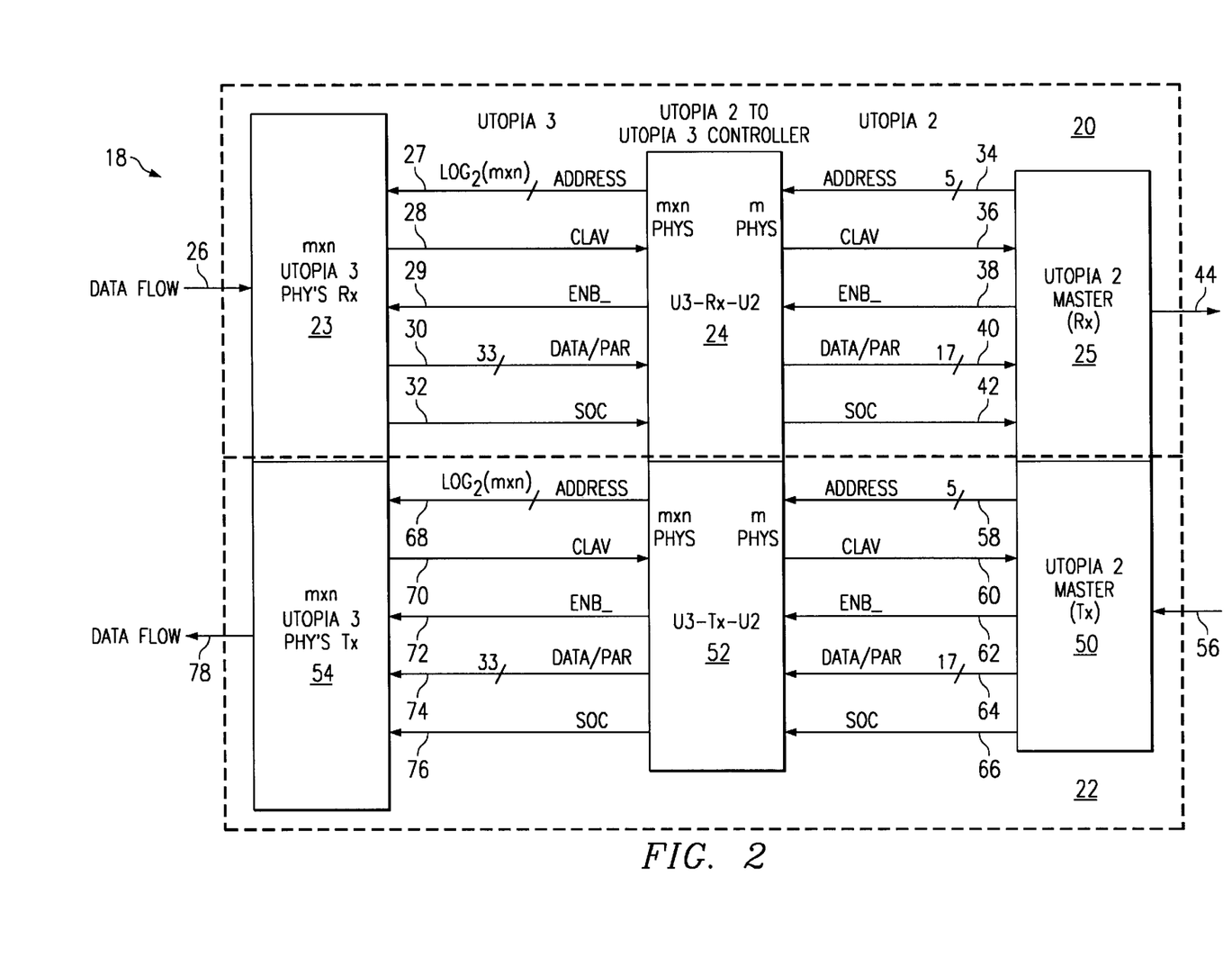
FIG. 2 illustrates UTOPIA 2 to UTOPIA 3 expander system in accordance with the teachings of the present invention.

FIG. 2 illustrates UTOPIA 2 to UTOPIA 3 expander system 18 in accordance with the teachings of the present invention. Expander system 18 includes a receiver side 20 and transmit side 22. Receiver side 20 in this specification shall mean receiving from a physical layer and passing it to a telecommunication level such as the ATM level, whereas transmit side 22 will be receiving from a telecommunication level, such as an ATM layer, and transmitting to a physical layer.

Receiver side 20 includes a UTOPIA 3 physical layer receiver 23 coupled to a UTOPIA 2 to UTOPIA 3 controller for the receiver side 24 and which is in turn coupled to UTOPIA 2 master controller receiver 25.

In operation, UTOPIA 2 to UTOPIA 3 controller 24 on the UTOPIA 3 controller side includes a first in first out (FIFO) buffer which is not pictured in FIG. 2 but will be explained further in conjunction with FIGS. 3 through FIG. 6. Data is sent from a modem (not pictured) via data flow 26. Typically, this data is in serial format, although that is not required. UTOPIA 3 physical layer receiver 23 is operable to internally convert the format of the incoming data to UTOPIA 3 format. UTOPIA 3 controller 24 will check for space in the buffer and if space is found, the address will be sent out to the physical layer receiver 23 along address line 27. If there is a cell in a physical layer, then UTOPIA 3 physical layer receiver 23 will send a cell-available signal along cell available line 28. UTOPIA 3 controller 24 would then resend the physical layer receiver address and send an enable signal back to physical layer receiver 23 along enable line 29. This will then cause UTOPIA 3 physical receiver 23 to send the data with a parity check line to UTOPIA 3 controller 24 to be placed in the first in first out buffer. At the same time, a start-of-cell signal is sent along line 32. The cell is then transferred and written to the FIFO buffer. The cell is then transferred to UTOPIA 3 controller 24 and after undergoing a 32-bit to 16-bit conversion, which is required because UTOPIA 3 operates with a 32 bit data path whereas UTOPIA 2 operates with a 16 bit data path, the data is written into the FIFO. In order to remove the data from the internal FIFO, UTOPIA 2 master 25 polls UTOPIA 2 to UTOPIA 3 controller 24 to check a specific location to see if data exists. If data exists in a cell of the FIFO, then the controller will send a cell-available (CLAV) signal over line 36. Then UTOPIA 2 master will enable a bus by sending a signal on enable line 38. This would cause data from the FIFO to be transferred along line 40 along with a parity check. A start of cell (SOC) signal will also be sent along line 42. The cell is then removed from the FIFO, the data transferred along line 17 to the UTOPIA 2 master controller 25 and then sent out to an ATM system. Instead of being sent to an ATM system via a switching matrix and an OC3 line.

Transmit side 22 of UTOPIA 2 to UTOPIA 3 expander system 18 includes UTOPIA 2 master controller 50 coupled to UTOPIA 2 to UTOPIA 3 transmit controller 52 which in turn is coupled to UTOPIA 3 physical layer transmitter 54.

In operation a data cell, such as an ATM cell, is received by UTOPIA 2 master 50. The UTOPIA 2 master 50 reads a special area of the header of the cell which identifies what physical device that cell is meant to be transmitted to. In one embodiment, this is known as the virtual circuit identifier (vci). Each physical layer device attached to UTOPIA 3 physical transceiver will have its own physical circuit identifier. UTOPIA 2 master 50 reads the virtual circuit identifier of the cell and determines how fast cells should be transmitted. The Utopia 2 master knows the rates of each physical layer PHY, therefore cells should not be transmitted faster than this known rate to prevent cell loss and data corruption. Master 50 also does vci queuing to accomplish this. Vci queuing involves buffering cells based on the cell's vci and assigning priorities. Additionally, cells could be removed from a buffer based on the vci. Master 50 then polls at the known rate the UTOPIA 2 to UTOPIA 3 controller on the UTOPIA 2 side in order to see if there is a space in the internal FIFO buffer. The internal details of the UTOPIA 2 to UTOPIA 3 controller will be seen in more detail in conjunction with FIGS. 5 and 6. If there is space available in the FIFO buffer, then the controller responds with a cell available (CLAV) signal along line 60. UTOPIA 2 master 50 then sends an enable signal along line 62 which enables the UTOPIA 2 to UTOPIA 3 controller 52 to receive data. The cell is then transferred to the controller via line 64 with a start of cell (SOC) signal sent along line 66. The data sent along line 64 also puts in a parity check. The UTOPIA 2 to UTOPIA 3 controller checks parity and then does a 16 to 32 bit conversion. This conversion is necessary because UTOPIA 3 uses a 32-bit data path whereas UTOPIA 2 uses a 16-bit data path. The controller writes the data into a buffer which is selected by the virtual circuit identifier. The virtual circuit identifier further relates which UTOPIA 3 PHY 54 the data will be transmitted to. UTOPIA 3 side of the controller 52 checks the buffer in a round-robin fashion. If a cell is found in the buffer, UTOPIA 3 physical layer 54 is polled by sending an address along line 68. If a cell can be received, then a cell available signal is sent along line 70 which in turn causes UTOPIA 3 controller side 52 to send an enable signal along line 72 and transmit data and a parity check along line 74. Also sent is a start of cell signal along line 76. Data is then transferred from the buffer through the UTOPIA 3 physical layer transmitter 54 along line 78.

Figure 3:
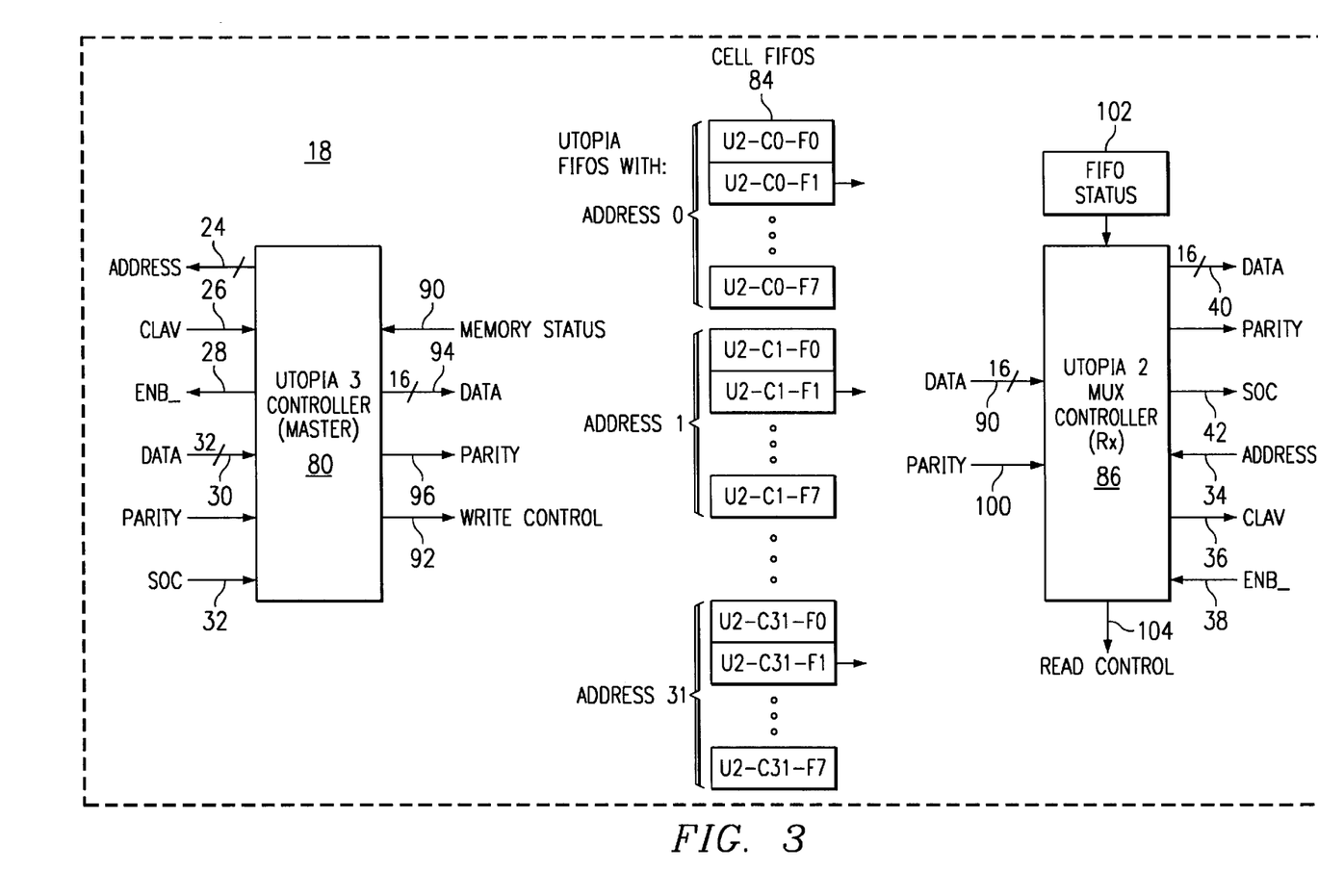
FIG. 3 illustrates a detailed block diagram of UTOPIA 2 to UTOPIA 3 receive controller.

FIG. 3 illustrates a detailed block diagram of UTOPIA 2 to UTOPIA 3 receive controller 18. UTOPIA 2 to UTOPIA 3 receive controller 18 includes a UTOPIA 3 controller master 80, a plurality of first in first out (FIFO) buffers 84, and a UTOPIA 2 multiplex controller 86. As discussed previously, UTOPIA 3 controller master 80 polls UTOPIA 3 physical layer receiver 16 in order to see if there is any information to be transmitted. A physical layer receiver will not be polled unless memory is available in the corresponding FIFO buffer 84 to store a cell. It does so by sending a signal along the address line 24. If there is an available cell, then a signal is sent along cell availability line 26 which causes UTOPIA 3 controller 80 to send an enable signal along line 28 and then data and parity information is sent along line 30. UTOPIA 3 controller 80 then converts the data internally from a 32-bit scheme to a 16-bit scheme. Data is stored after sending data along line 94 and a parity check along line 96. The write control line 92 is operable to control writing to the buffer 84.

Each UTOPIA 3 address or physical device has a two cell FIFO. The advantage of a two cell FIFO is that data can be read into and written from a given FIFO at the same time. There are multiple FIFOs for a UTOPIA 2 address, where the number of FIFOs is the total number of physical devices the UTOPIA 3 interface connects to. UTOPIA 3 port number determines which FIFO the cell goes to. Once data is stored in buffer 84, UTOPIA 2 master 25 polls UTOPIA 2 multiplex controller 86 to see if a cell is available by sending a signal along address line 34. If a cell is available, once it is received, UTOPIA 2 multiplex controller 86 checks the buffer status using FIFO status check 102 and if a cell is available, sends a signal along cell availability line 36. This will then cause UTOPIA 2 master 25 to send an enable signal along line 38 and then data is then read in from the buffer along line 90 and is sent out to the UTOPIA 2 master along line 40 and is sent out to a switching matrix along line 44 as illustrated in FIG. 2. Buffer status is checked in a round robin fashion of each for PHY block of buffers (UTOPIA 2 channels or addresses) to generate UTOPIA 2 cell available signal. Cells are read from the FIFO based on length of time in buffer.

Figure 4:
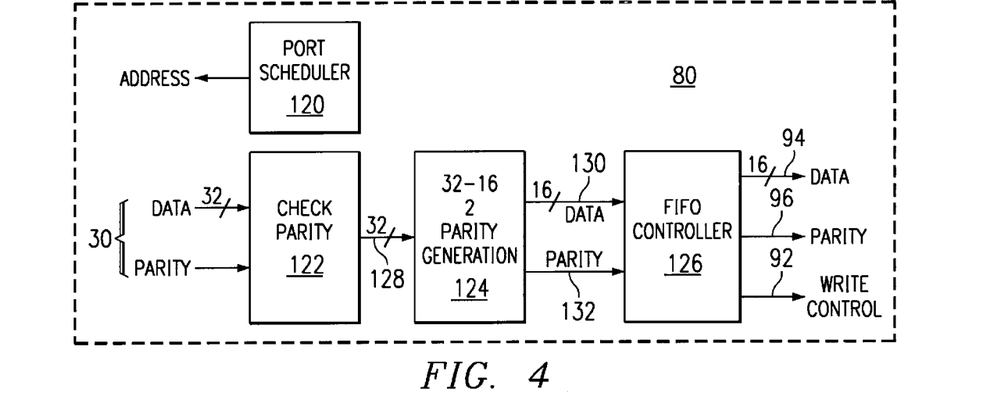
FIG. 4 illustrates receive UTOPIA 3 controller master 80 in detail.

FIG. 4 illustrates receive UTOPIA 3 controller master 80 in greater detail. UTOPIA 3 master controller 80 includes a port scheduler 120, a parity check 122 which in coupled to a 32-to-16 converter 124 which in turn is coupled to a FIFO controller 126. Port scheduler 120 is operable to control a rate of each physical device by outputting the address of the physical device on to the bus. This is also coupled to the FIFO status. Parity check 122 receives data and parity signal from UTOPIA 3 physical receiver 16 and checks to see if the parity is correct. If the parity is correct then it sends the data along line 128 as a 32-bit data. 32-to-16 bit data converter 124 is operable to convert the 32-bit data to 16-bit data for use by UTOPIA 2. Also a new parity signal is separated in 32-to-16 converter 124. The 16-bit data is then transferred along data line 130 to address transmitter 126 as is the parity check line 132. FIFO controller 126 is operable to determine which first in first out buffer the cell goes based on the port number of the physical device which this information came from. It then sends the data along data line 94 along with a parity signal sent along line 96. Again, write control lines is line 92 which controls the writing of the data to one of the m by n FIFOs.

Figure 5:
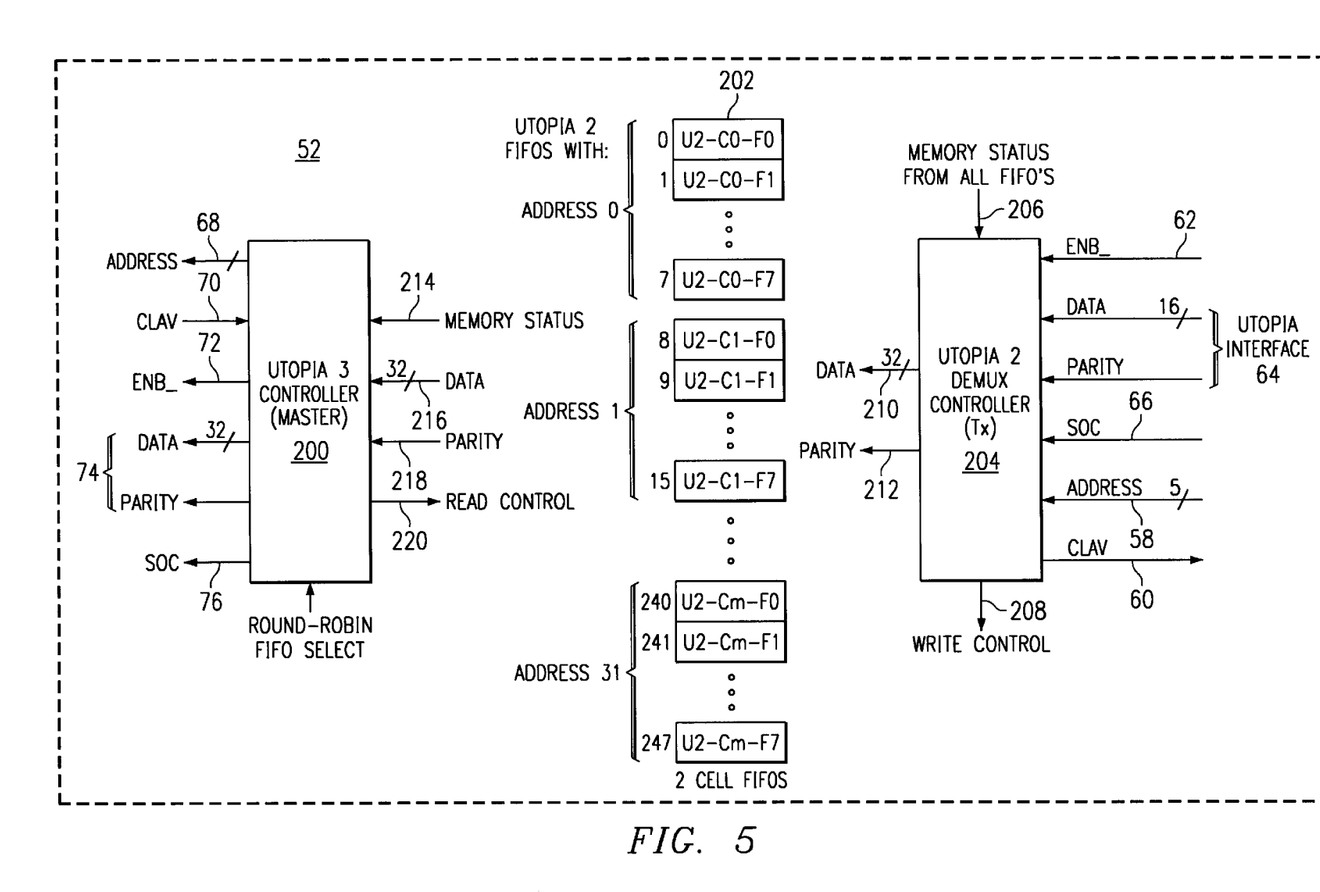
FIG. 5 illustrates UTOPIA 2 to UTOPIA 3 transmit controller in detail.

FIG. 5 illustrates UTOPIA 2 to UTOPIA 3 transmit control 52 in detail. Illustrated is a UTOPIA 2 demultiplexer controller 204 which is coupled to a plurality of first in and first out (FIFO) buffers 202 which in turn communicates with UTOPIA 3 controller master 200. Because this is at the transmit level, information is received from the telecommunication network level and transmitted to physical devices. As discussed in conjunction with FIG. 2, ATM cell 56 is received by UTOPIA 2 master 50. UTOPIA 2 master 50 is operable to read the virtual circuit identification in the header of the ATM cell to determine what physical device the cell is destined for and the rate at which to transfer cells for that virtual circuit identification. Once the cell is received by UTOPIA 2 master 50 it polls UTOPIA 2 demultiplexer control 204 to determine if there is room in FIFO buffers 202. A single UTOPIA 2 Master polling address consists of multiple virtual channels which further corresponds to a UTOPIA 3 physical device. Each physical device connected to the UTOPIA 3 device has a unique virtual circuit identification. If there is an opening in a FIFO buffer 202 then a cell available signal is sent along line 60 in return. In return UTOPIA 2 master 50 sends an enable signal on line 62 which will then allow data and parity to be sent along line 64 to UTOPIA demultiplexer controller 204. UTOPIA 2 demultiplexer controller 204 then does a parity check, a 16 to 32 bit conversion and possibly an address translation which will translate the cell header address to another address. During the translation, an address lookup takes place which, by looking at the virtual circuit identification, the destination FIFO buffer is determined. The address lookup occurs in UTOPIA demultiplexer 204. This is discussed in more detail in conjunction FIG. 6. After UTOPIA 2 demultiplexer controller 204 has converted the 16 bit information to 32 bit information it is then stored in FIFO buffers 202. Note that in case of UTOPIA 2 there can be only a total of 31 channels. UTOPIA 3 is not limited to five polling lines, thus UTOPIA 3 can have a number of additional channels for each UTOPIA 2 channel. For example, in this embodiment there were eight UTOPIA 3 channels for every one UTOPIA 2 channels for a total of 248 channels. This is why, in one embodiment, FIFO buffer 202 consists of 31 FIFO's of address of 0–30 for the 31 UTOPIA 2 channel. Each UTOPIA 2 address consists of eight UTOPIA 3 addresses resulting in 248 FIFOs that communicate with the UTOPIA 3 controller.

As mentioned before in conjunction with FIG. 2, ATM cells are received by UTOPIA 2 master 50 and based on a distinct virtual circuit identification that circuit is translated by UTOPIA 2 demultiplexer controller 204 and it is then determined where the cell should be stored or what path it is routed to after passing through UTOPIA 3 control master 200.

UTOPIA 3 controller master checks the FIFO buffers 202 in a round robin fashion. If there is information stored in FIFO buffers 202 that would be indicated by memory status line 214. UTOPIA 3 control master would then poll UTOPIA 3 physical layer 54 to see if a cell can be transferred. If so, UTOPIA 3 physical layer would return a cell available signal 70 to UTOPIA 3 control master 200. UTOPIA 3 controller master 52 would then send an enable signal and the data 32 and parity check would be sent from UTOPIA 3 controller after it is removed from the FIFO buffer. This data then goes to UTOPIA 3 physical layer 54 which further transfers the data to a physical device by data flow 78.

Figure 6:
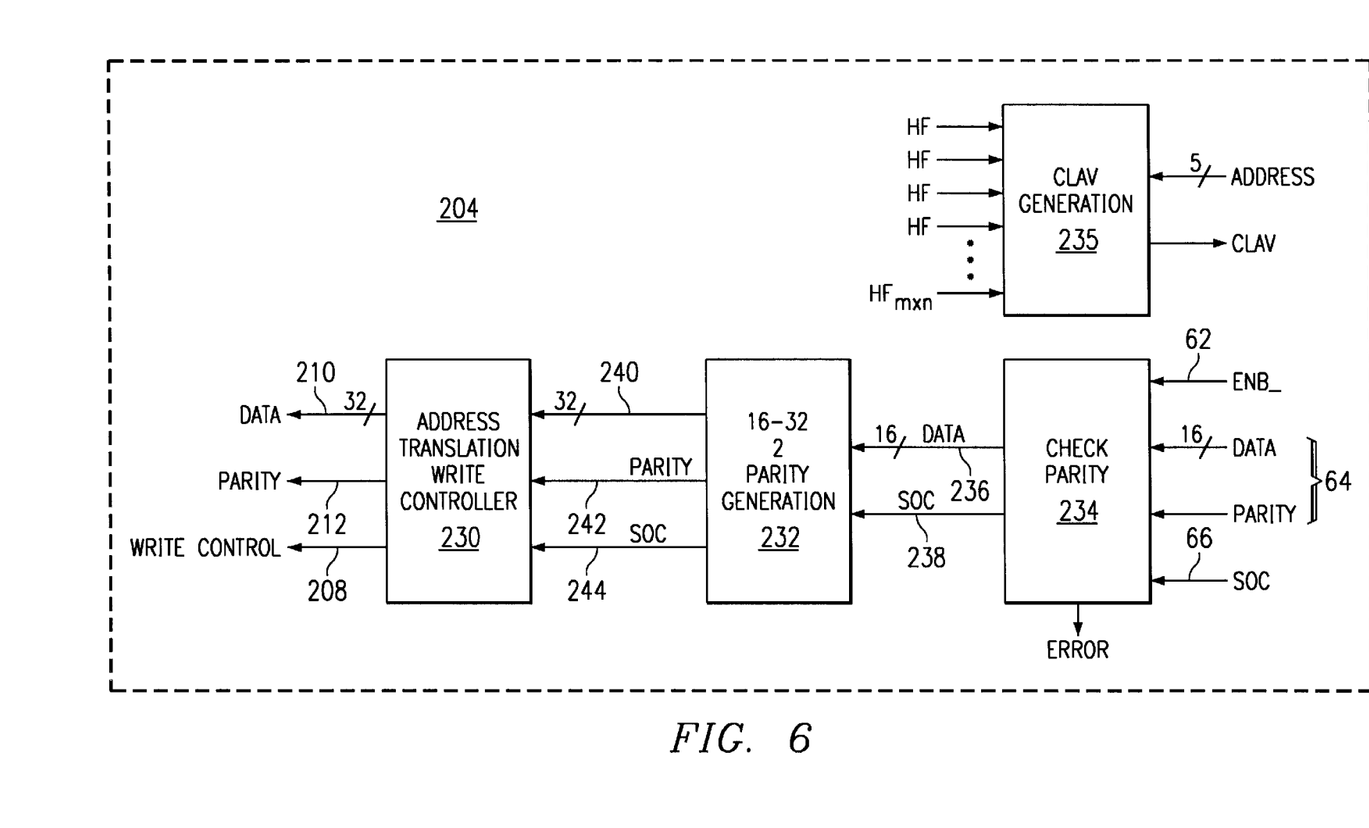
FIG. 6 illustrates UTOPIA 2 demultiplexer controller in detail.

FIG. 6 illustrates UTOPIA 2 demultiplexer controller 204 in detail. Demultiplexer controller 204 comprises an address translation write controller 230 coupled to a 16 to 32 bit converter 232 which is coupled to a parity check 234. Also included is a cell available generator 235. Cell available generator 235 is operable to receive an address poll from UTOPIA 2 master asking whether or not a cell can be sent and then checking the buffers to see if any one of the buffers is at least half full. Since the UTOPIA 2 master polls at a known rate, cell loss or data corruption will not occur. If so, a cell available signal is generated and sent back to UTOPIA 2 master 50. UTOPIA 2 master 50 then sends an enable signal to UTOPIA 2 demultiplexer controller 204.

After the enable is sent on line 62 that and a parity check is sent along line 64 to check parity 234. Parity is checked and if the parity is correct, the data is transferred along lines 236 to 16-to-32 bit converter 232. 16-to-32 bit converter 232 is operable to convert the 16 bit data of UTOPIA 2 format to the 32-bit data of UTOPIA 3 format. It also generates a parity signal. The 32 bit data is sent to address translator 230 via line 240 and a parity check signal is sent by a line 242 as its translator 230 operable to assign a new address based on the virtual circuit identification number on the ATM cell which was received by UTOPIA 2 master. This translation determines which of the 248 FIFO buffers 202 (in an exemplary environment) data should be stored. Once that is determined, data and parity are sent via lines 210 and 212 to FIFO buffer 202.

Although the present invention has been describe in detail, it should be understood that various changes, substitutions and alterations can be made thereto without departing from the spirit and scope of the invention as defined by the appended claims.

What is claimed is:

1. A system for an interface between a physical layer and a communication network comprising:
   a physical layer receiver operable to receive information from a physical layer device and convert it to a first format;
   a receive controller operable to receive data from physical layer receiver and convert it to a second format; and
   a master receiver coupled to receive controller and operable to receive information from the receive controller and send it to the communication network;

a master transmitter operable to receive data from a communication network and convert it to a second format;

a controller transmitter coupled to the master transmitter and operable to receive data from master transmitter;

a physical layer transmitter operable to receive data from the controller transmitter and deliver that data to a physical layer device; and wherein the first format is a UTOPIA 3 format.

2. The system of claim 1, wherein the second format is a UTOPIA 2 format.

3. The system of claim 1, wherein the physical layer receiver is operable to connect with an arbitrary number of physical layer devices.

4. The system of claim 1, wherein the physical layer receiver is operable to convert a modem format to the first format.

5. The system of claim 1, wherein the receive controller is operable to convert data at a first data path into a second data path.

6. The system of claim 5, wherein the first data path is a 32 bit path and the second data path is a 16 bit data path.

7. The system of claim 1, wherein the receive controller includes a plurality of buffers.

8. The system of claim 7, wherein the plurality of buffers are first-in-first-out buffers.

9. The system of claim 8, wherein the number of first-in-first-out buffers are equal to the number of physical layer devices.

10. The system of claim 7, wherein each buffer comprises multiple cells.

11. The system of claim wherein each buffer comprises two cells.

12. The system of claim 1, wherein each receive controller comprises a plurality of two cell first-in-first-out buffers.

13. The system of claim 1, wherein the master receiver comprises a port scheduler operable to control the rate of each physical devices.

14. The system of claim 1, wherein the master transmitter is operable to read an identifier from the header of the data received by the master transmitter and determine which physical device to route the data to.

15. The system of claim 1, wherein the transmit controller is operable to convert data in a second data path to data in a first data path.

16. The system of claim 15, wherein the first data path is a 32 bit data path and the second data path is a 16 bit data path.

17. The system of claim 1, wherein the transmit controller includes a plurality of buffers.

18. The system of claim 17, wherein the plurality of buffers are first-in-first-out buffers.

19. The system of claim 18, wherein the number of first-in-first-out buffers are equal to the number of physical layer devices.

20. The system of claim 17, wherein each buffer comprises multiple cells.

21. The system of claim 20, wherein each buffer comprises two cells.

22. The system of claim 1, wherein each transmit controller comprises a plurality of two cell first-in-first-out buffers.

23. A method for sending data from any number of physical layer devices to a communication network comprising the steps of:

polling a physical layer receiver to determine if a cell is available using a receive controller;

receiving a cell available signal from the physical layer receiver if a cell is available sending an enable signal from a controller to a physical layer receiver acknowledging that a cell is available and opening a bus to transfer data;

receiving data from the physical layer receiver at the receive controller and providing it in a first data format;

converting the data from a first data format to a second data format at the receive controller;

storing the information data in a buffer as a part of the receive controller;

receiving a poll from a master receiver, the poll requesting if information exists in a buffer resending the address;

sending a cell available signal to the master receiver if a cell is available in the buffer;

transferring the cell from the buffer of the controller interface to the master receiver; and transmitting the data to a communication network from the master receiver.

24. The method of claim 23, wherein the first format is a UTOPIA 3 format.

25. The method of claim 24, wherein the receive controller is operable to convert data at a first data path into a second data path.

26. The method of claims 25, wherein the first data path is a 32 bit path and the second data path is a 16 bit data path.

27. The method of claim 23, the second format is a UTOPIA 2 format.

28. The method of claims 23, wherein the physical layer receiver is operable to connect with an arbitrary number of physical layer devices.

29. The method of claim 23, wherein the physical layer receiver is operable to convert a modem format to the first format.

30. The method of claim 23, wherein the receiver controller includes a plurality of buffers.

31. The method of claim 30, wherein the plurality of buffers are first-in-first-out buffers.

32. The method of claim 31, wherein the number of first-in-first-out buffers are equal to the number of physical layer devices.

33. The method of claim 30, wherein each buffer comprises multiple cells.

34. The method of claim 33, wherein each buffer comprises two cells.

35. The method of claim 23, wherein each receive controller comprises a plurality of two cell first-in-first-out buffers.

36. A method for receiving information from a communication network and transmitting it to a physical layer device comprising:

receiving data from a communication network at a master transmitter and provide it in a second data format polling a transmit controller to check if there is space available for storage of that data on a buffer;

receiving a cell available signal from the transmit controller if space is available on the buffer;

transferring the data to the transmit controller;

converting the data from a second format to a first format;

storing the data in a buffer located in the transmit controller;

checking the buffer with the transmit controller in a round robin fashion;

polling a physical layer transceiver if data is found in the buffer;

receiving the cell availability from the transmit controller;

transferring data from the transmit controller to the physical layer transceiver; and transmitting the data to a physical layer device from the physical layer transceiver.

37. The method of claim 36, wherein the first format is a UTOPIA 3 format.

38. The method of claim 37, wherein the transmit controller is operable to convert data in a second data path to data in a first data path.

39. The method of claim 38, wherein the first data path is a 32 bit data path and the second data path is a 16 bit data path.

40. The method of claim 36, wherein the second format is a UTOPIA 3 format.

41. The method of claim 36, wherein the master receiver comprises a port scheduler operable to control the rate of each physical devices.

42. The method of claim 36, wherein the master transmitter is operable to read an identifier from the header of the data received by the master transmitter and determine which physical layer device to route the data to.

43. The method of claim 36, wherein the transmit controller includes a plurality of buffers.

44. The method of claim 43, wherein the plurality of buffers are first-in-first-out buffers.

45. The method of claim 44, wherein the number of first-in-first-out buffers are equal to the number of physical layer devices.

46. The method of claim 43, wherein each buffer comprises multiple cells.

47. The method of claim 46, wherein each buffer comprises two cells.

48. The method of claim 36, wherein each transmit controller comprises a plurality of two cell first-in-first-out buffers.

49. A system for an interface between a physical layer and a communication network comprising:

a physical layer receiver operable to receive information from a physical layer device and convert it to a first format;

a receive controller operable to receive data from physical layer receiver and convert it to a second format;

a master receiver coupled to receive controller and operable to receive information from the receive controller and send it to the communication network;

a master transmitter operable to receive data from a communication network and convert it to a second format;

a controller transmitter coupled to the master transmitter and operable to receive data from master transmitter;

a physical layer transmitter operable to receive data from the controller transmitter and deliver that data to a physical layer device;

wherein the receive controller is operable to convert data at a first data path into a second data path; and wherein the first data path is a 32 bit path and the second data path is a 16 bit data path.

50. A system for an interface between a physical layer and a communication network comprising:

a physical layer receiver operable to receive information from a physical layer device and convert it to a first format;

a receive controller operable to receive data from physical layer receiver and convert it to a second format;

a master receiver coupled to receive controller and operable to receive information from the receive controller and send it to the communication network;

a master transmitter operable to receive data from a communication network and convert it to a second format;

a controller transmitter coupled to the master transmitter and operable to receive data from master transmitter;

a physical layer transmitter operable to receive data from the controller transmitter and deliver that data to a physical layer device; and wherein the master receiver comprises a port scheduler operable to control the rate of each physical devices.

51. A system for an interface between a physical layer and a communication network comprising:

a physical layer receiver operable to receive information from a physical layer device and convert it to a first format;

a receive controller operable to receive data from physical layer receiver and convert it to a second format;

a master receiver coupled to receive controller and operable to receive information from the receive controller and send it to the communication network;

a master transmitter operable to receive data from a communication network and convert it to a second format;

a controller transmitter coupled to the master transmitter and operable to receive data from master transmitter;

a physical layer transmitter operable to receive data from the controller transmitter and deliver that data to a physical layer device;

wherein the transmit controller is operable to convert data in a second data path to data in a first data path; and wherein the first data path is a 32 bit data path and the second data path is a 16 bit data path.

* * * * *

UNITED STATES PATENT AND TRADEMARK OFFICE
CERTIFICATE OF CORRECTION

PATENT NO. : 6,751,233 B1
DATED : June 15, 2004
INVENTOR(S) : Hann

It is certified that error appears in the above-identified patent and that said Letters Patent is hereby corrected as shown below:

Title page,
Item [56], References Cited, "Utopia Level 2, Version 1.0" reference, after "1995", delete "60", and insert -- 69 --.

Column 7,
Line 32, after "claim", insert -- 10 --.
Line 38, after "physical", delete "devices", and insert -- device --.

Column 8,
Line 2, after "available", insert -- ; --.
Line 13, after "buffer", insert -- ; --.
Line 26, after "of", delete "claims", and insert -- claim --.
Line 28, after "23,", insert -- wherein --.
Line 30, after "of" delete "claims", and insert -- claim --.
Line 54, after "and" delete "provide", and insert -- providing --.
Line 54, after "format", insert -- ; --.

Column 9,
Line 20, after "physical", delete "devices", and insert -- device --.

Column 10,
Line 27, after "physical", delete "devices", and insert -- device --.

Signed and Sealed this

Twelfth Day of October, 2004

JON W. DUDAS
*Director of the United States Patent and Trademark Office*